United States Patent
Rieux-Lopez et al.

(10) Patent No.: US 8,134,350 B2
(45) Date of Patent: Mar. 13, 2012

(54) DEVICE FOR PRECHARGING A VOLTAGE CONVERTER, AND AN ASSEMBLY AND AIRCRAFT INCLUDING SUCH A DEVICE

(75) Inventors: Olivier Rieux-Lopez, Lisle sur Tarn (FR); Olivier Goguet, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 187 days.

(21) Appl. No.: 12/472,919

(22) Filed: May 27, 2009

(65) Prior Publication Data

US 2009/0296430 A1    Dec. 3, 2009

(30) Foreign Application Priority Data

May 29, 2008   (FR) ..................... 08 53542

(51) Int. Cl.
*G05F 1/40*   (2006.01)
(52) U.S. Cl. ......... 323/266; 323/288; 323/901; 323/908
(58) Field of Classification Search .................. 323/266, 323/282, 284, 288, 290, 901, 908; 307/85, 307/86
See application file for complete search history.

(56) References Cited

U.S. PATENT DOCUMENTS

| 5,635,804 | A | 6/1997 | Tanaka et al. | |
| 6,960,903 | B2 * | 11/2005 | Yamamoto | 323/282 |
| 7,560,898 | B1 * | 7/2009 | Kranzen et al. | 320/107 |
| 7,646,186 | B2 * | 1/2010 | Jung et al. | 323/284 |
| 2002/0191426 | A1 | 12/2002 | Hussein et al. | |

FOREIGN PATENT DOCUMENTS

FR   2 907 983   5/2008
JP   10-42551    2/1998

* cited by examiner

*Primary Examiner* — Jessica Han
(74) *Attorney, Agent, or Firm* — Oblon, Spivak, McClelland, Maier & Neustadt, L.L.P.

(57) ABSTRACT

A device for precharging a voltage converter is provided with a precharging unit, capable of assuming a closed state, as well as with a control unit for the precharging unit, the precharging unit being capable of operating according to a precharging state limiting the value of the precharging current passing through it, the control unit being capable of commanding the operation of the precharging unit according to the precharging state and, once the precharging has been completed, of commanding the precharging unit to change over from the precharging state to the closed state. The assembly has a chopping voltage converter and such a device disposed at the input of the converter. The aircraft is equipped with such a device or with such an assembly.

11 Claims, 4 Drawing Sheets

Figure 1:
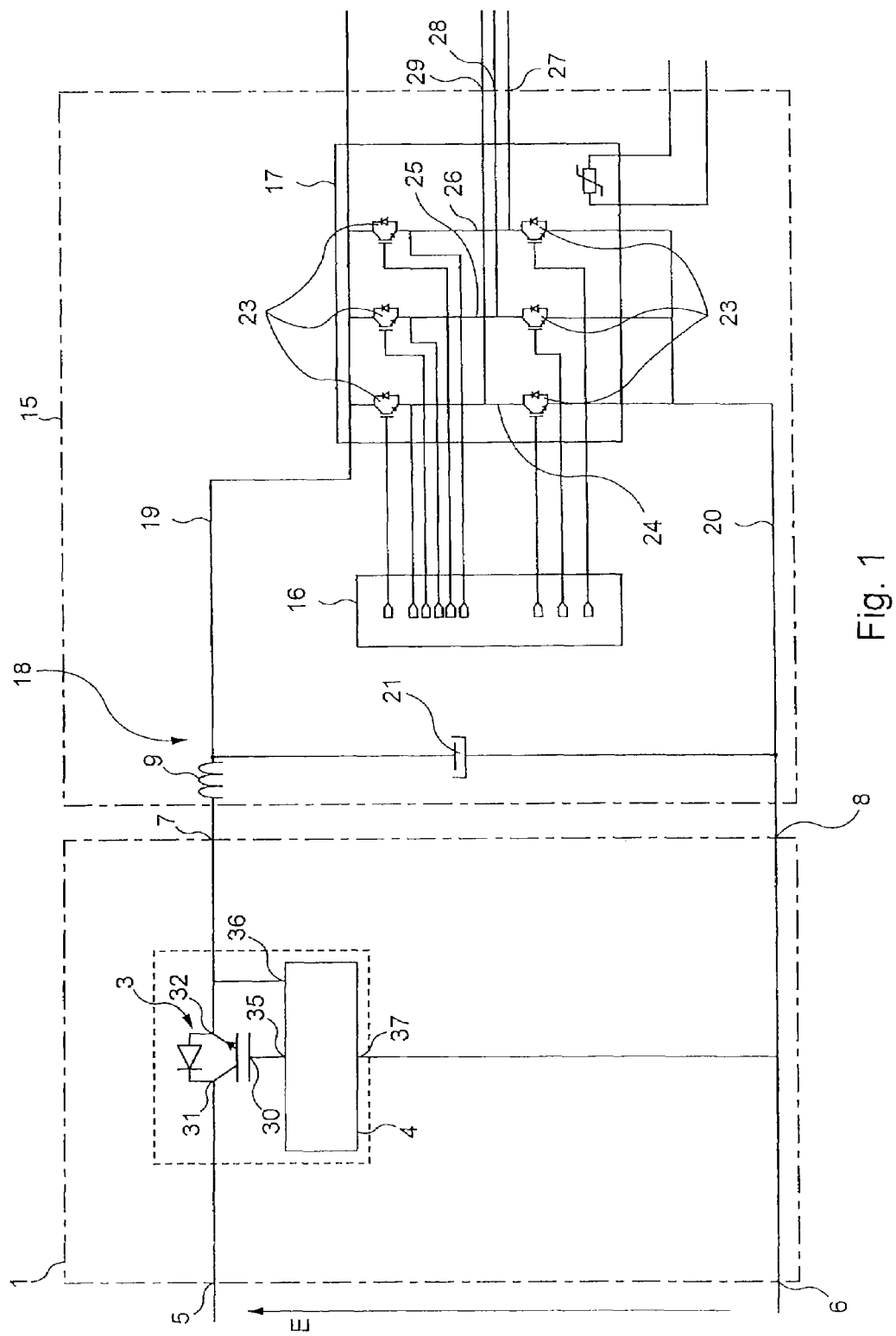

DEVICE FOR PRECHARGING A VOLTAGE CONVERTER, AND AN ASSEMBLY AND AIRCRAFT INCLUDING SUCH A DEVICE

The present invention relates to a device for precharging a chopping converter.

Chopping converters, such as voltage inverters intended, for example, to supply asynchronous motors, are equipped with one or more capacitors, which must be charged at a nominal d.c. supply voltage during or before startup of the converter.

The converter is associated with a current-limiting device to ensure that the charging current of the capacitors does not attain a value much higher than that of the nominal current of the converter during application of the nominal supply voltage.

In fact, such overcurrent could cause phenomena such as tripping of protective circuits situated upstream from the converter, transient electromagnetic perturbations, deterioration of the capacitor or capacitors, etc.

This current-limiting device, also known as "precharging device", makes it possible to charge the capacitor(s) of the inverter at a controlled current.

Especially from the French Patent Application of AIRBUS published under number FR 2907983, there are known such precharging devices equipped with a current-limiting unit (most often a power resistor) as well as with a precharging unit that can be commanded to close and that is disposed in parallel with the current-limiting unit, this unit being a switching unit (such as a relay, a transistor or even a thyristor).

Initially, the switching unit is open, such that the current passes through the current-limiting unit during charging of the capacitor or capacitors.

Once these capacitors have been charged, the switching unit is commanded to close in order to short-circuit the current-limiting unit, the current then passing through the closed switching unit in order to avoid voltage drops and to minimize the energy losses.

The invention seeks to provide a precharging device that is both more convenient and more compact.

To this end it proposes a device for precharging a voltage converter, the said converter being capable of transforming an input voltage signal into a voltage signal obtained by chopping the said input voltage signal, the said device being provided with a precharging unit capable of assuming a closed state, as well as with a control unit for the said precharging unit; characterized in that the said precharging unit is capable of operating according to a precharging state limiting the value of the precharging current passing through it, the said control unit being capable of commanding the operation of the precharging unit according to the precharging state and, once the said precharging has been completed, of commanding the said precharging unit to change over from the precharging state to the closed state.

In the device according to the invention, the precharging unit therefore has not only a closed state but also a precharging state, in which the precharging current passes through it, this unit being provided to limit the preloading current in this way. Thus this unit also satisfies the function of the prior-art current-limiting unit, while being able to be commanded to assume a closed state once precharging has been completed. In this device, therefore, it is possible to dispense with this current-limiting unit, thus making the device less bulky (of course, the power-dissipating means associated with the current-limiting unit are also no longer necessary).

The said precharging unit may have an open state preventing the precharging current from passing through it, the said control unit being capable of commanding changeover of the said precharging unit from the open state to the precharging state.

Thus, when it is not necessary to make the converter operate, the precharging unit makes it possible to disconnect the converter from the d.c. voltage supply, thus making it possible to protect this supply from a possible defect of the converter and to protect the converter from a possible overvoltage of this supply.

It is also possible to provide a precharging unit equipped with a transistor, the said control unit being capable of commanding the transistor to assume linear mode for the precharging state and saturated mode for the closed state.

Transistors are particularly suitable for dissipating the powers admissible for such converters, whereas the prior-art power resistors generally have reduced admissible powers and are very bulky, especially for use with pulsed power, as is the case here (duration on the order of 0.05 to 3 seconds in general).

The said control unit may also have a capacitor and a resistor in series between a connection point to be connected to the said converter, and an electrode of the transistor.

According to another optional characteristic, the control unit has an auxiliary supply connected to an electrode of the transistor, on the one hand via a first resistor and on the other hand via a second resistor, having lower resistance than the first resistor, and associated in series with a switching unit capable of being commanded to close when the potential of the said electrode of the transistor exceeds a predetermined threshold value.

The control unit is therefore provided to avoid any risk of return to the precharging state in the event of a sudden rise of the supply voltage.

According to yet another optional characteristic, the said control unit is capable of regulating the variation of voltage at the terminals of the said precharging unit.

The regulation of the voltage at the terminals of the precharging unit makes it possible to monitor the precharging current. In this way it is possible, for example by regulating this voltage such that it varies linearly with time, to charge the converter at a constant current.

The said device may also have optoelectronically coupled means for determining the state of the said device.

According to a second aspect, the invention also applies to a voltage-converting assembly, characterized in that it has a chopping voltage converter and a precharging device for the said converter such as explained hereinabove disposed at the input of the said converter.

The said converter is, for example, an inverter.

According to a third aspect, the invention also applies to an aircraft equipped with a device or with an assembly such as explained hereinabove.

The explanation of the invention will now be continued by the detailed description of an exemplary embodiment, given hereinafter for illustrative but non-limitative purpose, with reference to the attached drawings, wherein:

FIG. 1 is a schematic representation of the precharging device according to the invention and of an inverter with which it is associated;

FIGS. 2 to 5 are four timing diagrams respectively illustrating the variation with time of the voltage ($V_{GE}$) drawn between the gate and the emitter of an insulated-gate bipolar transistor (IGBT) with which the precharging device is equipped; of the voltage ($V_C$) at the terminals of the inverter capacitor to be charged; of the capacitor-charging current ($I_C$); and of the power dissipated by bipolar transistor IGBT.

Figure 6:
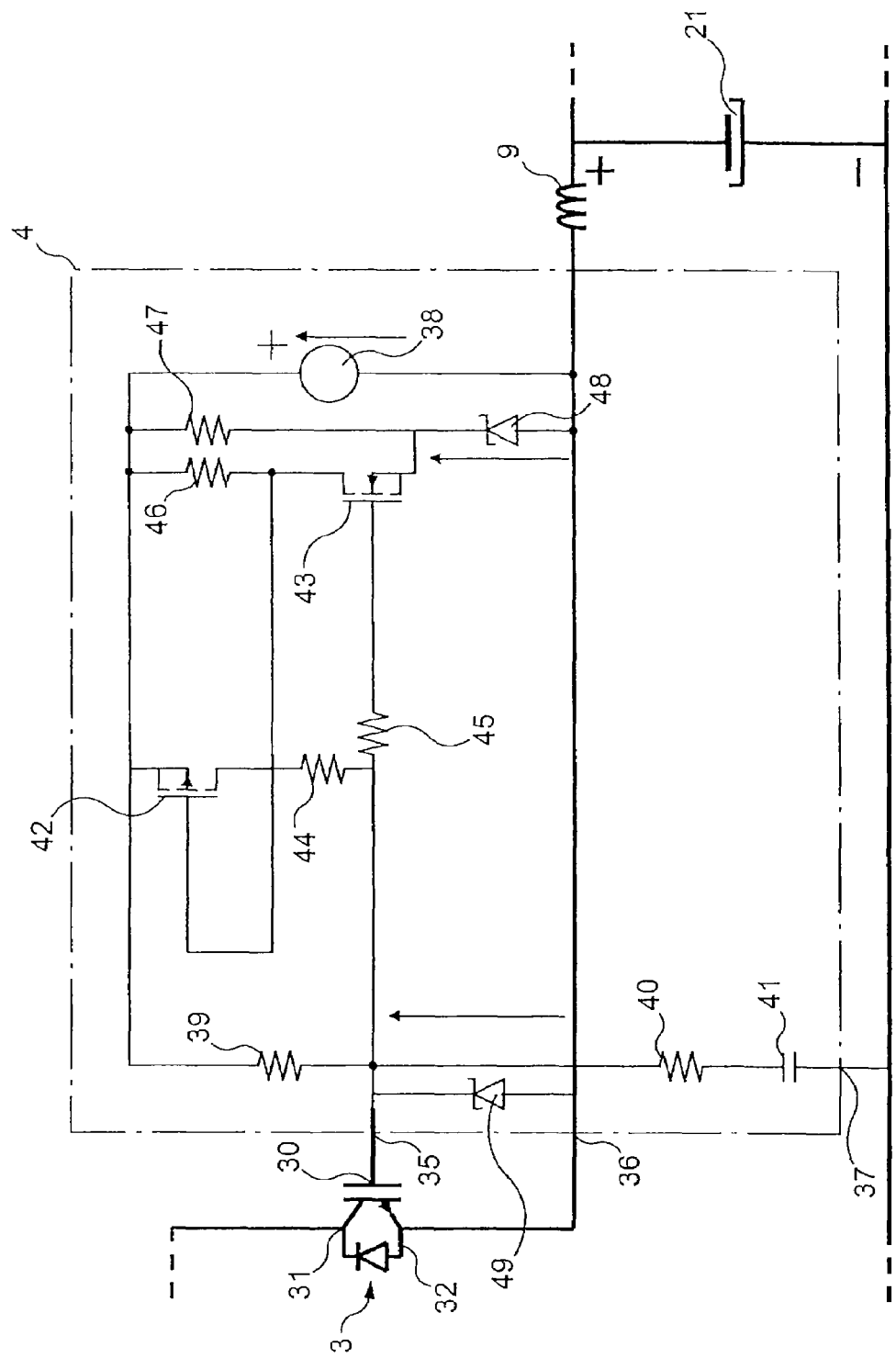
Figure 7:
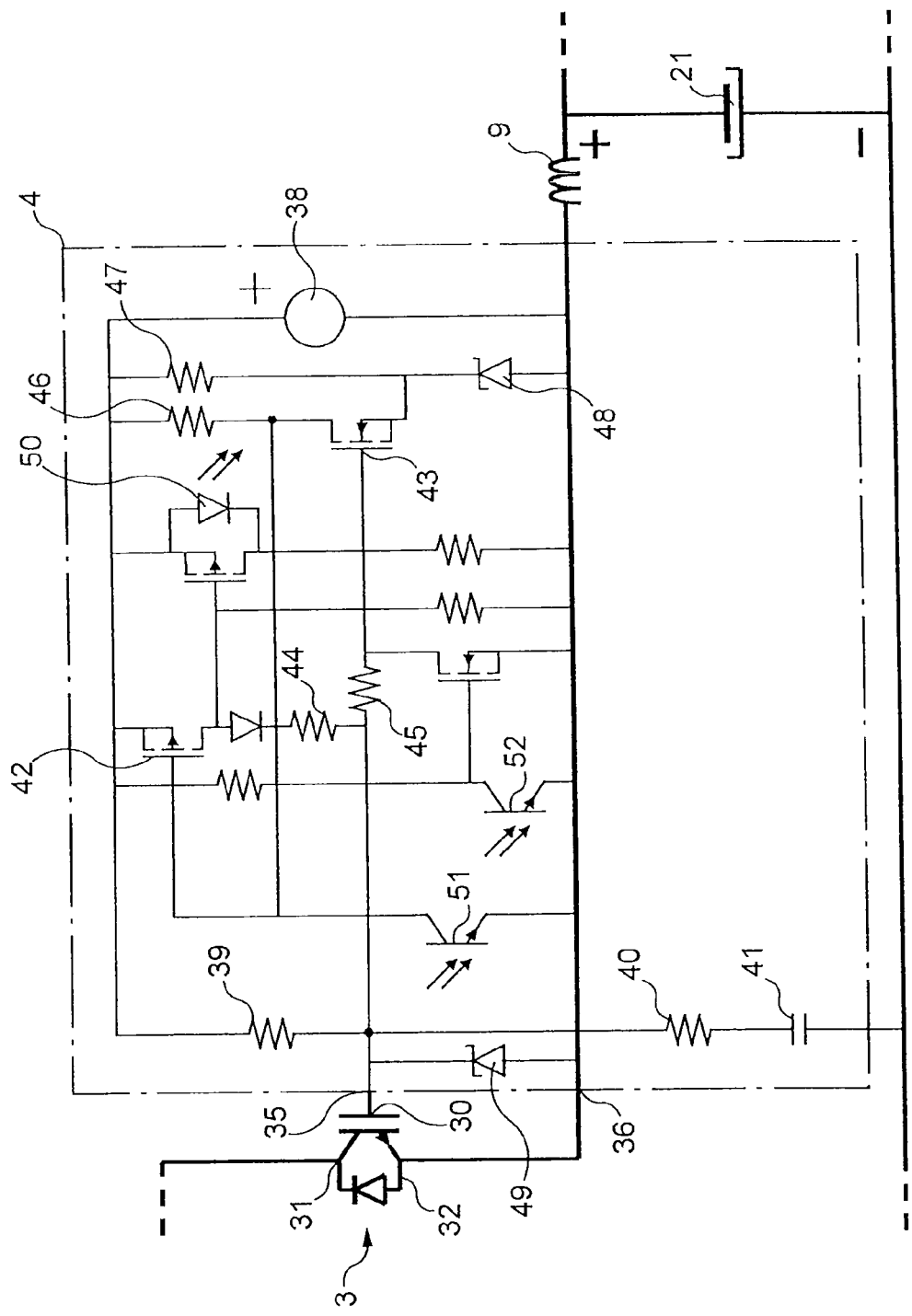

FIG. 6 is a detailed schematic representation of a control unit with which the precharging device illustrated in FIG. 1 is equipped, on which only the main elements have been represented; and FIG. 7 is a view similar to FIG. 6, but on which supplementary means for controlling and determining the state of the precharging device are also represented.

Precharging device 1 is equipped with a precharging unit 3, which is a switching unit (in this case an insulated-gate transistor IGBT) and a control unit 4 of this transistor.

The IGBT used here is an NPT 1 200 V transistor manufactured by APT® and sold under the reference APT35GN120BG.

This precharging device has two input connection points 5 and 6, between which there is applied a d.c. voltage E, and two points 7 and 8 for connection to an inverter 15.

Inverter 15 has a d.c. bus 18 and a switch group 17 commanded by a control unit 16.

Bus 18 has a first equipotential line 19 (also referred to as the "hot point" of the d.c. bus) and a second equipotential line 20 (also referred to as the "cold point" of the d.c. bus), as well as a filtering inductor 9 and a capacitor 21, connecting between them lines 19 and 20.

Switch group 17 has three arms 24 to 26, each equipped with two switches 23 (in this case transistors) commanded alternately to generate, in each arm of the inverter, an alternating square-wave voltage from the d.c. voltage E applied at the input of precharging device 1.

Inverter 15 has three output connection points 27 to 29, each connected to a corresponding arm.

As already indicated, switching unit 3 in this case is a bipolar transistor of IGBT type, whose collector 31 is connected to input connection point 5 and whose emitter 32 is connected to connection point 7. Gate 30 in turn is connected to a connection point of control unit 4.

This control unit 4 has three connection points 35, 36 and 37. Points 35 and 36 are respectively connected to gate 30 and emitter 32 of transistor 3. Point 37 is connected to connection points 6 and 8.

This control unit, illustrated in simplified manner in FIG. 6 and in detail in FIG. 7, has an auxiliary d.c. voltage supply 38 (15 volts), a resistor 39, a resistor 40, a capacitor 41 and a Zener diode 49.

The positive pole of supply 38 is connected to connection point 35 through resistor 39, while the other pole of this supply is connected to connection point 36.

Resistor 40 and capacitor 41 are disposed between connection points 35 and 37, while Zener diode 49 is disposed between connection points 35 and 36.

Control unit 4 is also provided with a P-channel MOSFET transistor 42 and an N-channel MOSFET transistor 43 as well as with a set of resistors 44, 45, 46 and 47 and a Zener diode 48, associated as illustrated on FIG. 6, so as to permit snug closing of transistor 3, as will be seen hereinafter.

Resistor 39 has a high value (100 kΩ), thus ensuring that the value $I_C$ of the charging current will not be too high.

Capacitor 41 has a capacitance of 75 nF, clearly lower than the 75 μF of capacitor 21 to be charged. Resistors 40, 44, 45, 46, 47 respectively have resistances of 82.5Ω, 82.5Ω, 4.75 kΩ, 10 kΩ and 4.75 kΩ. Inductor 9 has an inductance of 240 pH.

The operation of precharging device 1 during the phase of precharging of capacitor 21 of inverter 15 and beyond will now be described by means of the curves illustrated on FIGS. 2 to 5.

When a d.c. voltage E (in this case 800 volts) is applied between connection points 5 and 6 of the precharging device and auxiliary d.c. voltage source 38 is not in operation, transistor 3 remains open, thus isolating precharging device 1 and inverter 15 from the d.c. voltage supply E applied between points 5 and 6.

In the open state of transistor 3, the inverter is then not in operation.

When auxiliary source 38 is in operation, starting from instant $t_o$ on FIGS. 2 to 5, the precharging phase is then initiated and transistor 3 then operates in its linear mode to ensure charging of capacitor 21 with a controlled current.

The precharging state is a transistor state that in this way permits controlled charging of capacitor 21.

Figure 2:
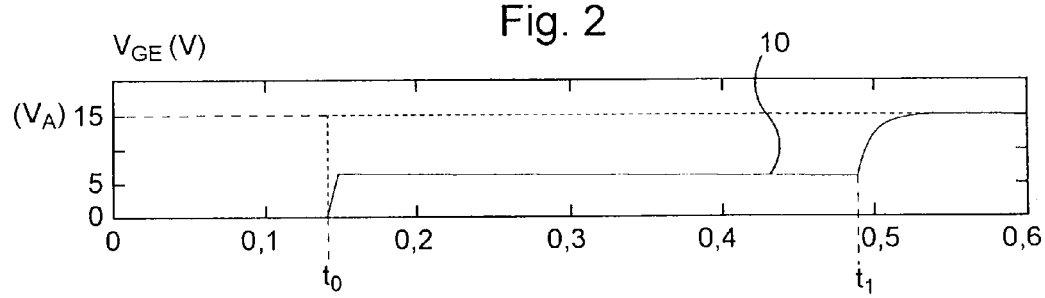

During precharging, the gate-emitter voltage $V_{GE}$, illustrated by curve 10 on FIG. 2, then becomes established at the value of 6 volts, which permits the IGBT to conduct the current consumed by charging of capacitor 21. The potential of emitter 32 of the IGBT follows the potential of gate 30 at close to 6 volts (corresponding to the voltage at the terminals of diode 49). During this phase the potential of gate 30 varies in substantially constant manner with time. This brings about the charging of capacitor 40 with constant current, or in other words with constant variation (dV/dt) of voltage at its terminals (the variation of the voltage drawn between the collector and emitter of the transistor is itself also constant).

Figure 4:
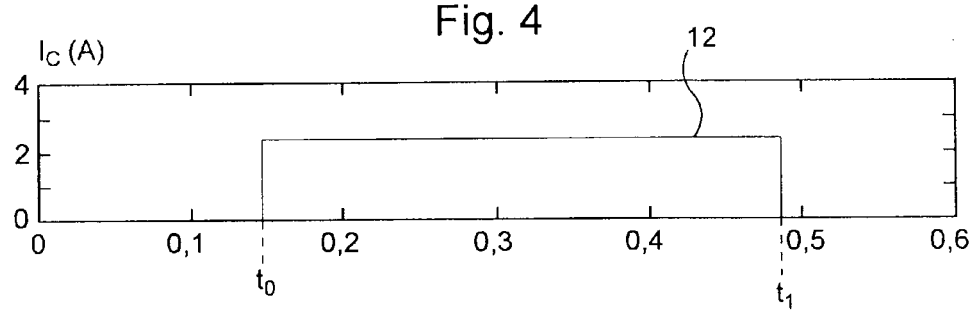

At constant current, the fact that dV/dt is imposed at the terminals of capacitor 41 causes capacitor 21 to become charged with a voltage variation $dV_C/dt$ that is also constant at its terminals, or in other words at constant and low current $I_C$, as illustrated by curve 12 on FIG. 4, the value of the current being a function of the voltage $V_{GE}$ of IGBT 3.

Figure 3:
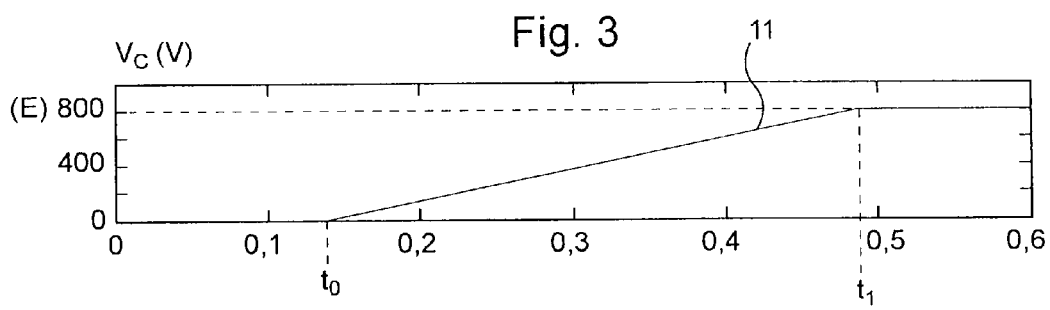

As illustrated by curve 11 on FIG. 3, this capacitor 21 is therefore charged progressively and linearly by this constant current $I_C$.

Figure 5:
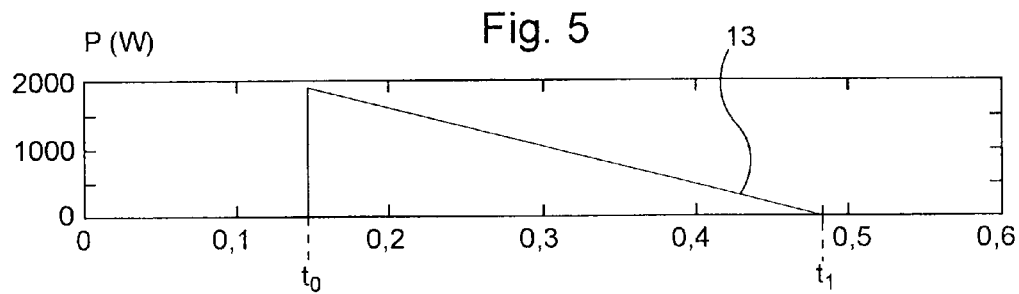

The power dissipated by IGBT 3 is represented by curve 13 on FIG. 5. This power decreases linearly, since the charging current passing through it is constant and the voltage drawn at the collector and emitter terminals of the transistor decreases linearly (when $V_C$ increases linearly), the dissipated power therefore varying in the same way as this voltage. This profile of power to be dissipated is particularly favorable since, on the one hand, it is fully controlled throughout the entire precharging phase and, on the other hand, it is optimized, since the power to be dissipated is maximal at the start of the cycle, at the very time when the transistor (still cold) is most capable of efficiently dissipating this power, this power decreasing with time and in this way preventing any risk of overheating of the component.

By virtue of the presence of a filtering inductor 9 on the converter, the precharging phase must take place over a sufficiently long duration compared with the natural period of the assembly formed by inductor 9 and capacitor 21, in order to ensure that it is indeed the precharging device that limits the charging current and not the inductive phenomena related to this inductor 9 (which would then risk bringing about a resonant charge producing an overvoltage).

It will be noted that, to simplify the explanation, the influence of this inductor was disregarded in constructing curves 10 to 13 illustrated on FIGS. 2 to 5.

At the end of the precharging phase, at the instant $t_1$, the transistor then changes over to saturated mode, in which emitter 32 and collector 31 of the IGBT are substantially at the same potential close to the saturation voltage of the transistor. The potential of emitter 32 then stops rising and the potential of gate 30 in turn continues to rise, until it is equal to that provided by auxiliary supply $V_A$. As illustrated on curve 10, the voltage $V_{GE}$ therefore continues to change beyond the instant $t_1$, until it becomes substantially equal to the auxiliary supply voltage $V_A$.

In this saturated mode, it is then possible to make the inverter operate, since transistor 3 is now closed, and thus can conduct a large current without being the source of excessive power losses.

In this way the closed state of transistor 3 permits operation of the inverter with previously charged capacitor 21.

Inverter 15 can then start up, so as to deliver, from the voltage at the terminals of capacitor 21, an alternating square-wave output voltage with a cyclic ratio and a predetermined chopping frequency that depends on the switching frequency of switches 23.

Of course, when the converter has no longer been in operation and when the precharging device is de-energized, transistor 3 returns to the open state, thus isolating the converter from the supply.

The arrangement of control unit 4 provided to guarantee that the switch is maintained snugly and stably in the closed state will now be described in detail.

Once the transistor is closed while the voltage $V_{GE}$ continues to rise beyond the instant $t_1$, until it exceeds a predetermined threshold value corresponding to the threshold voltage of Zener diode 48, this causes closing of MOSFET transistor 43, which in turn causes closing of MOSFET transistor 42, to the effect that, in the closed state of these two transistors, resistor 44 is connected between gate 30 and auxiliary supply 38. Since this resistor has very low resistance (82.5Ω), it therefore prevents any risk of seeing transistor 3 change back to the precharging state (for example, in the case of a disturbance on the d.c. voltage supply system that could cause a large and sudden variation of this voltage), which, if that occurred when a high current passing through it with a voltage at its terminals also high, could cause destruction thereof.

As illustrated on FIG. 7, control unit 4 may also be optionally equipped with a photodiode 50 and two phototransistors 51 and 52. By sensing whether or not light is being emitted, photodiode 50 makes it possible to know the state of the precharging circuit and especially of transistor 42. For maintenance operations or for increased safety, for example, phototransistor 52 makes it possible to assure that transistor 3 is forcibly maintained in the open state, while phototransistor 51 in turn makes it possible to assure that this transistor 3 is forcibly maintained in the open state to conduct validation tests on the precharging device.

As a variant, IGBT 3 may be replaced by a MOSFET transistor or by a simple bipolar transistor.

According to another variant, the control unit proceeds, in order to limit the current through transistor 3, to inject a constant and small current (such as 0.01 mA) into the transistor gate, this transistor then closing progressively with a limited current passing through it, thus permitting capacitor 21 to become charged before complete closing of this transistor; the nonlinear capacitive effect between the gate and the emitter (Miller effect) limits the variation of voltage at the terminals of the capacitor and therefore its charging current.

In yet another variant, the control unit is provided to inject a current (such as 10 mA) into the base of transistor 3 which in this variant is a simple NPN or PNP bipolar transistor, during the time necessary for charging of the capacitor, the charging current of the capacitor then being controlled and equal to the current multiplied by the β coefficient of the transistor.

In yet another variant, the control unit is capable of making the command voltage ($V_{GS}$ for a MOSFET and $V_{GE}$ for an IGBT) increase linearly and slowly, in such a way that the electronic switch is closed progressively.

Yet another alternative would consist in providing a control unit capable of measuring the charging current of the capacitor and regulating this current directly in the transistor.

Such precharging devices may be associated not only with a d.c. to a.c. converter such as an inverter, as described hereinabove, but also with other types of converter, such as a d.c. to d.c. converter (chopper).

Numerous other variants are possible depending on the circumstances, and in this regard it is recalled that the invention is not limited to the examples described and represented.

The invention claimed is:

1. A device for precharging a voltage converter, the converter being capable of transforming an input voltage signal into a voltage signal obtained by chopping the input voltage signal, the device comprising:
a precharging unit configured to assume a closed state,
a control unit for the precharging unit and
a first connection point and a second connection point for connection to the converter;
wherein the precharging unit is configured to operate according to a precharging state limiting the value of the precharging current passing through the precharging unit, the control unit being configured to command the operation of the precharging unit according to the precharging state and, once the precharging has been completed, to command the precharging unit to change over from the precharging state to the closed state,
where in the control unit includes an auxiliary power supply connected to the first connection point and to a gate of the precharging unit, and a capacitor interposed between the gate and the connection point.

2. A device according to claim 1, wherein said precharging unit has an open state preventing the precharging current from passing through the precharging unit, and wherein said control unit is configured to command changeover of said precharging unit from the open state to the precharging state.

3. A device according to claim 1 wherein said precharging unit is equipped with a transistor, the control unit being configured to command the transistor to assume linear mode for the precharging state and saturated mode for the closed state.

4. A device according to claim 3, wherein said control unit includes said capacitor and a resistor in series.

5. A device according to claim 3, wherein the auxiliary supply is connected to the gate of the transistor, on the one hand via a first resistor and on the other hand via a second resistor, having lower resistance than the first resistor and associated in series with a switching unit configured to be commanded to close when the potential of said gate of the transistor exceeds a predetermined threshold value.

6. A device according to claim 1, wherein said control unit is configured to regulate the variation of voltage at the terminals of said precharging unit.

7. A device according to claim 6, further comprising optoelectronically coupled means for determining the state of said device.

8. A voltage-converting assembly comprising a chopping voltage converter and, disposed at the input of said converter, a device according to claim 1 for precharging said converter.

9. An assembly according to claim 8, wherein said converter is an inverter.

10. An aircraft equipped with a device according to claim 1.

11. A device according to claim 1, wherein the auxiliary power supply is a voltage supply and wherein the auxiliary power supply is connected to the gate via a resistor.

* * * * *